United States Patent
Uemura et al.

(10) Patent No.: US 9,351,206 B2
(45) Date of Patent: *May 24, 2016

(54) METHOD, MOBILE STATION DEVICE, BASE STATION DEVICE, AND MOBILE COMMUNICATION SYSTEM FOR GAP-GENERATION DETERMINATION

(71) Applicant: SHARP KABUSHIKI KAISHA, Osaka-shi, Osaka (JP)

(72) Inventors: Katsunari Uemura, Chiba (JP); Wahoh Oh, Chiba (JP); Hidekazu Tsuboi, Chiba (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,311

(22) Filed: Aug. 7, 2014

(65) Prior Publication Data

US 2014/0348016 A1 Nov. 27, 2014

Related U.S. Application Data

(63) Continuation of application No. 12/299,150, filed as application No. PCT/JP2007/060459 on May 22, 2007.

(30) Foreign Application Priority Data

May 23, 2006 (JP) ................. 2006-142652

(51) Int. Cl.
*H04W 36/00* (2009.01)
*H04W 24/10* (2009.01)
(Continued)

(52) U.S. Cl.
CPC .......... *H04W 36/0083* (2013.01); *H04W 24/02* (2013.01); *H04W 24/10* (2013.01); *H04W 36/14* (2013.01); *H04L 1/0026* (2013.01)

(58) Field of Classification Search
None
See application file for complete search history.

(56) References Cited

U.S. PATENT DOCUMENTS 6,201,966 B1 3/2001 Rinne et al.
6,498,933 B1 12/2002 Park et al.
(Continued)

FOREIGN PATENT DOCUMENTS

EP 1 511 241 A2 3/2005
JP 2003-78957 A 3/2003
(Continued)

OTHER PUBLICATIONS

3GPP TR (Technical Report) 25.814, "Technical Specification Group Radio Access Network; Physical Layer Aspects for Evolved UTRA", (Release 7), V1.0.1 (Nov. 2005), pp. 1-72.
(Continued)

*Primary Examiner* — Christine Duong
(74) *Attorney, Agent, or Firm* — Birch, Stewart, Kolasch & Birch, LLP

(57) ABSTRACT

A mobile station device that communicates with a base station device. The mobile communication receives, from the base station device, a control signal for permitting the mobile station device to perform monitoring neighboring cell. The mobile station device also generates a gap based on one length of plural lengths, the gap being used in the monitoring, the one length corresponding to a measurement type of a neighboring cell according to a predetermined rule, the plural lengths being common with the base station, and the predetermine rule being common with the base station.

2 Claims, 14 Drawing Sheets

(51) Int. Cl.
*H04W 36/14* (2009.01)
*H04W 24/02* (2009.01)
*H04L 1/00* (2006.01)

(56) References Cited

U.S. PATENT DOCUMENTS

| | | | |
|---|---|---|---|
| 7,020,108 | B2 | 3/2006 | Virtanen |
| 7,133,382 | B2 | 11/2006 | Steudle |
| 7,672,254 | B2 | 3/2010 | Kim et al. |
| 7,688,799 | B2 | 3/2010 | Yamamoto |
| 7,787,881 | B2 | 8/2010 | Ueda |
| 8,358,629 | B2 | 1/2013 | Grilli et al. |
| 2002/0006119 | A1* | 1/2002 | Steudle .................. 370/329 |
| 2003/0045333 | A1 | 3/2003 | Kimata et al. |
| 2003/0117980 | A1 | 6/2003 | Kim et al. |
| 2005/0083873 | A1 | 4/2005 | Yamamoto |
| 2005/0260992 | A1 | 11/2005 | Moon et al. |
| 2005/0286468 | A1 | 12/2005 | Agin et al. |
| 2006/0034245 | A1 | 2/2006 | Nguyen |
| 2006/0126577 | A1 | 6/2006 | Yano et al. |
| 2006/0165028 | A1 | 7/2006 | Hiraki et al. |
| 2006/0183482 | A1 | 8/2006 | Ueda |
| 2006/0293008 | A1 | 12/2006 | Hiraki et al. |
| 2007/0030830 | A1* | 2/2007 | Sagne et al. ................ 370/336 |
| 2007/0037594 | A1* | 2/2007 | Palenius et al. ............. 455/502 |
| 2007/0037601 | A1 | 2/2007 | Mittal et al. |
| 2007/0097914 | A1 | 5/2007 | Grilli et al. |
| 2007/0223611 | A1 | 9/2007 | Ode et al. |
| 2008/0095132 | A1 | 4/2008 | Lindoff et al. |
| 2008/0189970 | A1 | 8/2008 | Wang et al. |
| 2008/0309490 | A1 | 12/2008 | Honkanen et al. |
| 2009/0010219 | A1 | 1/2009 | Lee et al. |
| 2009/0203381 | A1 | 8/2009 | Ueda |
| 2010/0046654 | A1 | 2/2010 | Ode et al. |

FOREIGN PATENT DOCUMENTS

| | | | |
|---|---|---|---|
| JP | 2003-525555 | A | 8/2003 |
| JP | 2005-64571 | A | 3/2005 |
| JP | 2005-64752 | A | 3/2005 |
| JP | 2005-79738 | A | 3/2005 |
| JP | 2005-522121 | A | 7/2005 |
| JP | 2005-354196 | A | 12/2005 |
| JP | 2006-60809 | A | 3/2006 |
| JP | 2006-173861 | A | 6/2006 |
| JP | 2006-222845 | A | 8/2006 |
| JP | 2007-129588 | A | 5/2007 |
| JP | 2008-205566 | A | 9/2008 |
| WO | WO 01/65882 | A1 | 9/2001 |
| WO | WO 2006/046307 | A1 | 5/2006 |
| WO | WO 2007/053851 | A2 | 5/2007 |
| WO | WO 2008/102531 | A1 | 8/2008 |
| WO | WO 2010/007763 | A1 | 1/2010 |

OTHER PUBLICATIONS

3GPP TR 25.913, "Technical Specification Group Radio Access Network; Requirements for Evolved UTRA (E-UTRA) and Evolved UTRAN (E-UTRAN)", (Release 7), V7.2.0 (Dec. 2005), pp. 1-17.
Motorola, "E-UTRAN Measurement Gap Control for Inter-Frequency and Inter-RAT Handover", 3GPP TSG-RAN WG2 Meeting #58, Japan, May 7-11, 2007, R2-072012.
NTT DoCoMo, Inc. "Inter-frequency/RAT Measurement Gap Control", 3GPP TSG RAN WG1 and WG2 Joint Meeting, #52, 2006, R2-060841.
U.S. Office Action issued in U.S. Appl. No. 12/300,768 on Aug. 4, 2011.
U.S. Office Action issued in U.S. Appl. No. 12/300,768 on Mar. 2, 2012.
U.S. Office Action issued in U.S. Appl. No. 14/105,400 on Sep. 5, 2014.
3GPP TR 36.913 V8.0.0 (Jun. 2008), 3rd Generation Partnership Project; Technical Specification Group Radio Access Network; Requirements for Further Advancements for E-UTRA (LTE-Advanced) (Release 8), <http://www.3gpp.org/ftp/Specs/html-info/36913.htm>.
3GPP TS 36.331 V8.2.0 (May 2008), 3rd Generation Partnership Project; Technical Specification Group Radio Access Network; Evolved Universal Terrestrial Radio Access (E-UTRA) Radio Resource Control (RRC); Protocol Specification (Release 8), <http://www.3gpp.org/ftp/Specs/html-info/36331.htm>.
3GPP TSG-RAN WG2#62 R2-082706, Mar. 2008, 14.2 Inter-frequency measurements, Various corrections due to editorial problems detected during CR implementation after RAN-39[online], pp. 1385-1393.
Ericsson: "Carrier Aggregation in LTE-Advanced", TSG-RAN WG1 #53bis, R1-082468, 3rd Generation Partnership Project (3GPP), Warsaw, Poland, Jun. 30-Jul. 4, 2008.
ETSI TS 136 300 V8.4.0 (Apr. 2008); Evolved Universal Terrestrial Radio Access (E-UTRA) and Evolved Universal Terrestrial Radio Access (E-UTRAN); Overall Description; Stage 2 (3GPP TS 36.300 Version 8.4.0 Release 8), Apr. 1, 2008.
European Search Report issued in European Patent Application No. 07743893.5 on Jan. 23, 2013.
European Search Report issued in European Patent Application No. 09814520.4 on Dec. 18, 2012.
International Search Report issued in International Application No. PCT/JP2009/065834 on Dec. 15, 2009.
Non-patent Document 1: "W-CDMA Mobile Communication System" by Keiji Tachikawa, ISBN 4-621-04894-5.
Non-patent Document 2: 3GPP TR (Technical Report) 25.858, and 3GPP HSDPA-specification-related document (http://www.3gpp.org/ftp/Specs/html-info/25-series.htm).
Non-patent Document 3: 3GPP TR (Technical Report) 25.903, V0.2.0 (Nov. 2005), Continuous Connectivity for Packet Data Users. (http://www.3gpp.org/ftp/Specs/html-info/25903.htm).
Non-patent Document 4: 3GPP TR (Technical Report) 25.814, V1.1.1 (Feb. 2006), Physical Layer Aspects for Evolved UTRA. (http://www.3gpp.org/ftp/Specs/html-info/25814.htm).
Non-patent Document 5: NTT DoCoMo, Inc., "Measurement for LTE Intra-and Inter-RAT Mobility", 3GPP TSG RAN WG2 Meeting #50, Sophia Antipolis, France, Jan. 9-13, 2006, R2-060086. (http://www.3gpp.org/ftp/tsg_ran/WG2_RL2/TSGR2_50/Documents/).
NTT DoCoMo, Measurements for LTE Intra- and Inter RAT Mobility, [online], 3GPP TSG RAN WG2 #50, R2-060086, Jan. 2006, [retrieved on Aug. 9, 2007], Retrieved from the Internet: <URL: http://www.3gpp.org/ftp/tsg_ran/WG2_RL2/TSGR2_50/Documents/R2-060086.zip>.
QualcommEurope, 3GPP RAN2#50, Sophia Antipolis, France, Jan. 9-13, 2006, "R2-060058".
QualcommEurope, 3GPP RAN2#56bis, Sorrento, Italy, Jan. 15-19, 2007, "R2-070239".
U.S. Advisory Action issued in U.S. Appl. No. 12/299,150 on Apr. 11, 2012.
U.S. Notice of Allowance issued in U.S. Appl. No. 12/299,150 on Jun. 6, 2014.
U.S. Notice of Allowance issued in U.S. Appl. No. 13/120,119 on Jun. 5, 2013.
U.S. Notice of Allowance issued in U.S. Appl. No. 13/120,119 on Sep. 13, 2013.
U.S. Office Action issued in U.S. Appl. No. 12/299,150 on Aug. 26, 2011.
U.S. Office Action issued in U.S. Appl. No. 12/299,150 on Jan. 3, 2012.
U.S. Office Action issued in U.S. Appl. No. 12/299,150 on Jan. 31, 2014.
U.S. Office Action issued in U.S. Appl. No. 13/120,119 on Jan. 15, 2013.
ZTE, Clarification of PDCCH description [online], 3GPP TSG-RAN2 WG2 Meeting#63, R2-084739, Jeju, Korea, Aug. 18-22, 2008.

* cited by examiner

FIG. 2

| MEASUREMENT TYPE | MOBILE STATION DEVICE CLASS | REQUIRED GAP LENGTH (TTI) |
|---|---|---|
| FREQUENCY MEASUREMENT | Class 1 | 1 |
| | Class 2 | 2 |
| | Class 3 | 4 |
| | Class 4 | 8 |
| INTER-RAT MEASUREMENT (RAT #a) | Class 1 | 2 |
| | Class 2 | 4 |
| | Class 3 | 6 |
| | Class 4 | 8 |
| INTER-RAT MEASUREMENT (RAT #b) | Class 1 | 3 |
| | Class 2 | 5 |
| | Class 3 | 8 |
| | Class 4 | 12 |

| CQI REPORT VALUE | ENCODING METHOD | MODULATION METHOD | ... |
|---|---|---|---|
| 0 (RsvCQI) | Type 1 | Type a | ... |
| 1 | Type 2 | Type a | ... |
| 2 | Type 3 | Type a | ... |
| 3 | Type 4 | Type a | ... |
| 4 | Type 5 | Type a | ... |
| 5 | Type 6 | Type a | ... |
| 6 | Type 7 | Type a | ... |
| 7 | Type 1 | Type b | ... |
| 8 | Type 2 | Type b | ... |
| 9 | Type 3 | Type b | ... |
| 10 | Type 4 | Type b | ... |
| 11 | Type 5 | Type b | ... |
| 12 | Type 6 | Type b | ... |
| 13 | Type 7 | Type c | ... |
| 14 | Type 1 | Type c | ... |
| 15 | Type 2 | Type c | ... |
| ... | ... | ... | ... |

T2

METHOD, MOBILE STATION DEVICE, BASE STATION DEVICE, AND MOBILE COMMUNICATION SYSTEM FOR GAP-GENERATION DETERMINATION

This application is a Continuation of copending application Ser. No. 12/299,150, filed on Oct. 31, 2008, which was filed as PCT International Application No. PCT/JP2007/060459 on May 22, 2007, which claims the benefit under 35 U.S.C. §119(a) to Patent Application No. 2006-142652, filed in Japan on May 23, 2006, all of which are hereby expressly incorporated by reference into the present application.

TECHNICAL FIELD

The present invention relates to a mobile communication method, a mobile station device, a base station device, and a mobile communication system.

Priority is claimed on Japanese Patent Application No. 2006-142652, filed May 23, 2006, the content of which is incorporated herein by reference.

BACKGROUND ART

Currently, RAT (Radio Access Technology) of W-CDMA (Wideband-Code Division Multiple Access, see Non-patent Document 1) defined by 3GPP (3rd Generation Partnership Project) has been standardized as the third-generation cellular-mobile-communication method, and services thereof have started sequentially. In the W-CDMA system, a compressed mode is defined as a function of monitoring a base station device on a different frequency upon an inter-frequency handover between cells belonging to the same RAT, an inter-RAT handover, and an intra-RAT handover.

FIG. 13 at (a) shows a case where the compressed mode is applied to DPCH (Dedicated Physical Channel) of W-CDMA and monitoring of a base station device on a different frequency is in execution.

The base station device generates a gap that is a transmission intermission as shown in FIG. 13 at (a) and suspends data transmission over the dedicated physical channel at the gap. In FIG. 13 at (a), one frame has a time length of 10 ms, and the gap is generated at a part of a frame. On the other hand, a mobile station device switches a frequency utilizing the gap and monitors the base station device on the different frequency.

In 3GPP, HSDPA (High Speed Downlink Packet Access) that implements high-speed downlink packet transmission of the approximate maximum transmission speed of 14. 4 Mbps that is the expansion of the W-CDMA radio interface is standardized. In the downlink, HS-SCCH (High Speed-Downlink Shared Control Channel) and HS-PDSCH (High Speed-Physical Downlink Shared Channel) are additionally defined as independent channels different from the dedicated channel to which the compressed mode is normally applied. In the uplink, HS-DPCCH (High Speed Dedicated Physical Control Channel) is defined additionally.

AMCS (Adaptive Modulation and Coding Scheme) is adopted in HSDPA. The AMCS is a method in which radio transmission parameters, such as the data-modulation multiple-value number of the shared data channel, an error correcting method, an error-correction encoding ratio, the data-modulation multiple-value number, a code spreading factor of time and frequency axes, and the multi-code multiplexed number, are switched according to a downlink CQI (Channel Quality Indication) that is a propagation path condition of each mobile station device to efficiently execute the high-speed packet-data transmission. Additionally, HARQ (Hybrid Automatic Repeat reQuest) is adopted. The mobile station device feeds ACK/NACK (Acknowledgement/Negative Acknowledgement) that is received transmittal confirmation information, and the CQI back to the base station device over the dedicated control channel. The base station device executes scheduling so as not to transmit the HS-PDSCH to a mobile station device in a gap section generated in the compressed mode upon HSDPA (FIG. 13 at (c) explained hereinafter).

FIG. 13 at (b) and (c) shows an example of a packet signal transmitted from the base station device to the mobile station device. FIG. 13 at (b) shows an example of the HS-SCCH transmitted from the base station device to the mobile station device. FIG. 13 at (c) shows an example of the HS-PDSCH transmitted from the base station device to the mobile station device.

The HS-SCCH (FIG. 13 at (b)) is used for indicating whether the packet data transmitted over the HS-PDSCH (FIG. 13 at (c)) is addressed to the mobile station device or another mobile station device.

FIG. 13 at (b) shows that the HS-PDSCH has indicated the packet data addressed to the mobile station device (corresponding to the hatched frames therein). Arrows m1 to m5 indicate to which subframe of the HS-SCCH the packet data to be received by the mobile station device is actually transmitted.

FIG. 14 is a sequence chart showing the processing of the mobile communication system in execution of the compressed mode. The mobile station device reports a message including a measurement result of a serving cell or neighboring cells that is being currently measured to the base station device (step S01). The base station device determines whether or not gap generation is necessary for a handover requiring a different frequency measurement for each mobile station device based on the received measurement result (step S02). The base station device transmits a message including gap pattern information to a mobile station device that is determined to require the gap generation (step S03). The mobile station device receiving the message transmits a response message to the base station device (step S04), executes gap generation control according to the gap pattern, and commences a monitoring of a base station device allocated a different frequency (step S05). The radio communication at steps S01, S03, and S04 between the mobile station device and the base station device are executed by a control signal called an L3 message at L3 (Layer 3) that is an upper network layer.

In HSDPA, a method for the mobile station device to suspend a CQI report over the uplink HS-DPCCH in order to reduce the transmission power and the uplink interference level of the mobile station device in the case of no packet data being addressed to the mobile station device in a given section during packet communication, i.e., while the mobile station device receives no data over the HS-PDSCH, has been proposed (see Non-patent Document 3).

FIG. 15 is a sequence chart showing the processing of the mobile communication system related to the CQI-report suspension. The base station device has a function of monitoring a transmission data buffer. If no transmission data occurs for a given period after the buffer becomes empty, the base station device instructs a CQI-report suspension to the mobile station device (step S11). As a result, the mobile station device suspends the CQI report to the base station device (step S12). The CQI-report suspension is indicated from the base station device to the mobile station device through the HS-SCCH.

If a transmission of data is detected, the base station device immediately instructs a CQI-report resumption to the mobile station device through the HS-SCCH (step S13). As a result, the mobile station device resumes the CQI report to the base station device (step S14). The HS-SCCH is an L1 message that is not transferred to the upper layer and terminated at L1 (Layer 1). The mobile station device decodes signal bits of the HS-SCCH and thereby recognizes the CQI-report suspension or resumption.

On the other hand, there are communication systems called EUTRA (Evolved Universal Terrestrial Radio Access) and EUTRAN (Evolved Universal Terrestrial Radio Access Network) (see Non-patent Document 4). OFDMA (Orthogonal Frequency Division Multiplexing Access) to which the AMCS is applied is proposed as an EUTRA downlink. In addition, a downlink radio-frame configuration and a radio-channel mapping method based on the CQI are proposed (see Non-patent Document 4).

As a gap control method in EUTRA/EUTRAN, similar to FIG. 14, in addition to the method in which the base station device determines gap necessity based on the measurement result of the mobile station device and executes scheduling in consideration of the mobile station device that requires a gap, an autonomous gap control method in which the mobile station device measures an instantaneous CQI, feeds the instantaneous CQI back to the base station device, and thereby autonomously controls gap generation is proposed (see Non-patent Document 5).

A gap in EUTRA/EUTRAN indicates a section in which the base station device executes packet scheduling so as not to allocate data transmission and reception to the mobile station device so that the mobile station device can monitor a base station device on a different frequency, and which is different from a compressed-mode execution section in W-CDMA.

FIG. 16 at (a) and (b) is an explanatory view of the autonomous gap generation control executed by the mobile station device. The mobile station device receives a pilot signal of a common pilot channel from the base station device, measures an instantaneous CQI at a given CQI-measurement interval, and reports the measured instantaneous CQI to the base station device. The instantaneous CQI is instantaneous power of the pilot signal as an example. At the same time, the mobile station device calculates an average CQI by averaging the instantaneous CQIs at a given period. The mobile station device compares the measured average CQI with a CQI threshold of the system parameters. If the average CQI is greater than the CQI threshold, the mobile station device sets a normal mode thereto (see FIG. 16 at (a)). If the average CQI is smaller than the CQI threshold, the mobile station device sets a measurement mode for monitoring a base station device on a different frequency to the mobile station device (see FIG. 16 at (a)). If the measured instantaneous CQI is smaller than the average CQI in the measurement mode, the mobile station device suspends reception or transmission at the frequency utilized by the connected base station device, and generates a gap section. When receiving the report of the instantaneous CQI, the base station device calculates the average CQI of the mobile station device similar to the mobile station device. The calculated average CQI is compared with the CQI threshold of the system parameters. If the average CQI is greater than the CQI threshold, the base station device sets the normal mode thereto. If the average CQI is smaller than the CQI threshold, the base station device sets the measurement mode thereto. If the measured instantaneous CQI is smaller than the average CQI in the measurement mode, the base station device suspends the transmission of packet data addressed to the connected mobile station device, and generates a gap.

FIG. 16 at (b) is a partially enlarged view of FIG. 16 at (a) and schematically shows a state where multiple gaps are generated continuously.

Non-patent Document 1: "W-CDMA Mobile Communication System" by Keiji Tachikawa, ISBN 4-621-04894-5

Non-patent Document 2: 3GPP TR (Technical Report) 25.858, and 3GPP HSDPA-specification-related document Non-patent Document 3: 3GPP TR (Technical Report) 25.903, V0.2.0 (2005-11), Continuous Connectivity for Packet Data Users.

Non-patent Document 4: 3GPP TR (Technical Report) 25.814, V1.1.1 (2006-2), Physical Layer Aspects for Evolved UTRA.

Non-patent Document 5: NTT DoCoMo, Inc. "Measurement for LTE Intra- and Inter-RAT Mobility", 3GPP TSG RAN WG2 Meeting #50, Sophia Antipolis, France, 9-13 Jan. 2006, R2-060086.

DISCLOSURE OF THE INVENTION

Problems to be Solved by the Invention

The two methods (see FIGS. 14 and 16) are proposed as the gap generation method in EUTRA/E-UTRAN.

However, the method in which the base station device determines gap generation necessity based on a measurement result of the mobile station device has a problem in that multiple L3 messages have to be transmitted therebetween as control signals until a gap is generated, thereby consuming a large amount of radio resources. Additionally, there is another problem in that it takes processing time from when the mobile station device transmits a gap generation request to when a gap is actually generated.

On the other hand, the autonomous gap-generation control method has a problem in that multiple resource blocks are occasionally mapped to one mobile station device in the OFDMA system, and the mobile station device has to report instantaneous CQIs corresponding to the received multiple resource blocks to the base station device, thereby increasing uplink radio-resource consumption. Additionally, there is another problem in that transmission of instantaneous CQIs, the number of which is reduced for a reduction of the uplink radio-resource consumption, causes a mismatch of a gap start timing or a gap end timing.

The present invention is made in consideration of the circumstances, and an object thereof is to provide a mobile communication method, a mobile station device, a base station device, and a mobile communication system that can generate a gap quickly and reduce radio resource consumption.

Means for Solving the Problems

A mobile communication method of the present invention is of generating, by a mobile station device, a gap section for suspending communication with a base station device and monitoring another base station device during the communication. The mobile communication method includes: transmitting, by the mobile station device, a report of channel quality indications of measured radio channels to the base station device; transmitting, by the base station device, a control signal indicative of suspension or resumption of the report to the mobile station device; determining, by the base station device, whether or not gap generation is necessary based on the report received from the mobile station device; generating, by the base station device, a gap section of a given length so as not to allocate a packet to the mobile station device in the gap section when it is determined that the gap generation is necessary; allowing, by the base station device, the gap generation by transmitting the control signal indicative of the suspension of the report to the mobile station device; receiving, by the mobile station device, the control signal indicative of allowance of the gap generation during a period in which the report is transmitted; generating, by the mobile station device, a gap section of the given length; and monitoring, by the mobile station device, another base station device in the gap section.

In the mobile communication method, the report transmitted by the mobile station device includes a given number of channel quality indications measured at radio frequency bands in use for the communication that are divided by a given range. Values of a given pattern are set to the given number of channel quality indications when the report is used as a gap generation request.

In the mobile communication method, at least one of the reports is used as a gap generation request if the report is repeatedly transmitted at a given time interval.

A mobile station device of the present invention communicates with a base station device, and includes: a request-signal generating unit that sets multiple channel quality indications to be included in a report according to a given pattern to request gap generation for suspending the communication for a handover and monitoring another base station device; a gap-generation-request-signal transmitting unit that transmits the report of the channel quality indications having the given pattern to the base station device; a control-signal receiving unit that receives, from the base station device, a control signal indicative of suspension or resumption of the report during a period in which the report is transmitted; and a transmission control unit that controls the gap generation according to the control signal.

The transmission control unit of the mobile station device generates a gap section of a given length when the suspension of the report is indicated by the control signal, and suspends the gap generation and continues current packet communication when the resumption of the report is indicated by the control signal.

A base station device of the present invention communicates with a mobile station device, and includes: a gap-generation determining unit that determines whether or not multiple channel quality indications indicated by the mobile station device include a given pattern, and determines whether or not gap generation is necessary when the given pattern is included; a control-signal generating unit that generates a control signal for indicating suspension or resumption of a report of the channel quality indications to the mobile station device according to a determination result by the gap-generation determining unit; and a control-signal transmitting unit that transmits the control signal to the mobile station device.

The control-signal generating unit of the base station device generates a gap section of a given length so as not to allocate a packet to the mobile station device in the gap section, and a control signal for indicating the resumption of the report to the mobile station device when the gap-generation determining unit determines that the gap generation is necessary, and generates a control signal for indicating the suspension of the report to the mobile station device when the gap-generation determining unit determines that the gap generation is unnecessary.

A mobile communication system of the present invention includes a mobile station device and a base station device. The mobile station device includes: a request-signal generating unit that sets multiple channel quality indications of measured radio channels according to a given pattern; a gap-generation-request-signal transmitting unit that transmits a report of the channel quality indications having the given pattern to the base station device; a control-signal receiving unit that receives, from the base station device, a control signal indicative of suspension or resumption of the report during a period in which the report is transmitted; a transmission control unit that controls gap generation according to the control signal. The base station device includes: a gap-generation determining unit that determines whether or not the channel quality indications indicated by the mobile station device include the given pattern, and determines whether or not gap generation is necessary when the given pattern is included; a control-signal generating unit that generates a control signal for indicating suspension or resumption of the report to the mobile station device according to a determination result by the gap-generation determining unit; and a control-signal transmitting unit that transmits the control signal to the mobile station device.

Effects of the Invention

According to the mobile communication method, the mobile station device, the base station device, and the mobile communication system of the present invention, a gap can be generated quickly and radio resource consumption can be reduced.

BRIEF DESCRIPTION OF THE DRAWINGS

FIG. 2 is an illustration showing an example of a table T1 that is stored in a storing unit 21 of the mobile station device 10 and for determining a gap length;

FIG. 3 is an illustration showing an example of a table T2 that is stored in a storing unit 21 of the mobile station device 10 and for defining RsvCQI;

Figure 1:
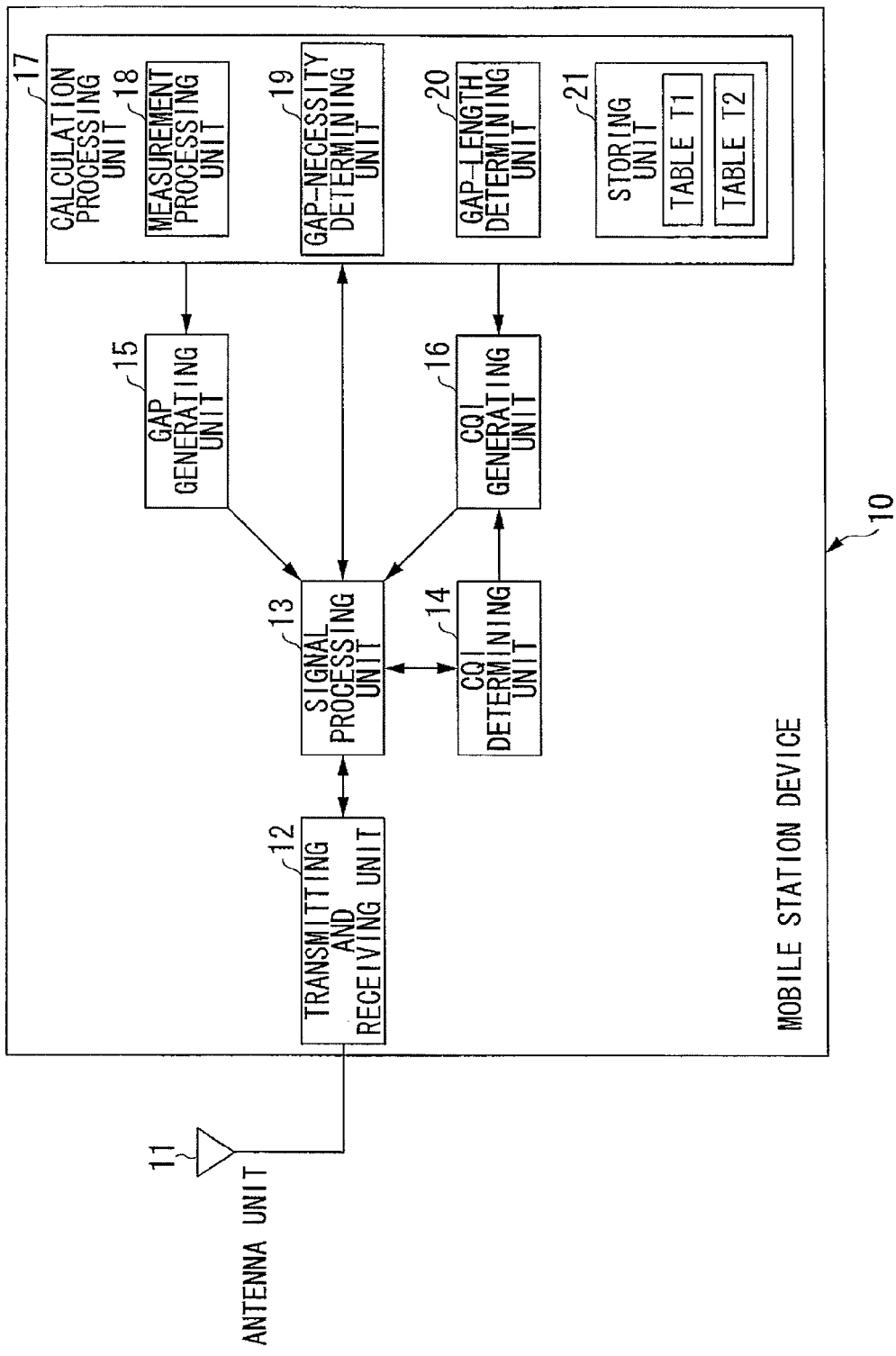
FIG. 1 is a schematic block diagram showing the configuration of a mobile station device 10 according to a first embodiment of the present invention.

DESCRIPTIONS OF REFERENCE NUMERALS 10 mobile station device
11 antenna unit
12 transmitting and receiving unit
13 signal processing unit
14 CQI determining unit
15 gap generating unit
16 CQI generating unit
17 calculation processing unit
18 measurement processing unit
19 gap-necessity determining unit
20 gap-length determining unit
21 storing unit
30 base station device
31 antenna unit
32 transmitting and receiving unit
33 signal processing unit
34 control-signal generating unit
35 gap generating unit
36 calculation processing unit
37 gap-necessity determining unit
38 gap-length determining unit
39 packet scheduling unit
40 storing unit

BEST MODE FOR CARRYING OUT THE INVENTION

First Embodiment

FIG. 1 is a schematic block diagram showing the configuration of a mobile station device 10 according to a first embodiment of the present invention. The mobile station device 10 includes an antenna unit 11, a transmitting and receiving unit 12 (a gap-generation-request-signal transmitting unit, a control-signal receiving unit), a signal processing unit 13 (transmission control unit), a CQI determining unit 14, a gap generating unit 15, a CQI generating unit 16 (request-signal generating unit), and a calculation processing unit 17.

The calculation processing unit 17 executes a series of control concerning radio control and includes a measurement processing unit 18, a gap-necessity determining unit 19, a gap-length determining unit 20, and a storing unit 21.

A CQI report value set to a particular identical value by the CQI generating unit 16 is referred to as RsvCQI, hereinafter.

The antenna unit 11 is used for transmitting and receiving a radio signal. The radio signal received by the antenna unit 11 is output to the transmitting and receiving unit 12. The transmitting and receiving unit 12 demodulates and decodes the received radio signal, encodes and modulates transmission data, and transmits communication data to the antenna unit 11. Additionally, the transmitting and receiving unit 12 transmits and receives a control signal and data to and from the base station device through the antenna unit 11. Further, the transmitting and receiving unit 12 transmits a gap-generation request signal generated by the CQI generating unit 16 as an L1 message to the base station device through the antenna unit 11 (using a physical channel).

The signal processing unit 13 analyzes control data (a control signal) that is from the base station device and transferred from the transmitting and receiving unit 12, and controls the transmitting and receiving unit 12 according to an input parameter (explained hereinafter).

Additionally, the signal processing unit 13 suspends or resumes transmission of a CQI report value to the base station device based on the control signal received by the transmitting and receiving unit 12.

The CQI determining unit 14 calculates a CQI report value according to a reception level of a pilot signal through CPICH (Common Pilot Channel). The CQI report value is, for example, an instantaneous power of the pilot signal for each resource block, a value obtained by time averaging instantaneous powers of the pilot signal for each resource block, or a value obtained by time averaging instantaneous powers of the pilot signal for entire resource blocks. When the gap-necessity determining unit 19 explained hereinafter determines to generate a gap, the gap generating unit 15 generates a gap whose length is determined by the gap-length determining unit 20. A gap is a period for the mobile station device 10 to monitor a base station device. The mobile station device and the base station device suspend data transmission and reception at a gap.

The CQI generating unit 16 generates a CQI signal based on the CQI report value calculated by the CQI determining unit 14. Additionally, the CQI generating unit 16 generates a gap-generation request signal for requesting generation of a gap that is the period for monitoring a base station device to the base station device. More specifically, the CQI generating unit 16 sets all of multiple CQI report values to be indicated to the base station device equally to an identical given value, and thereby generates the gap-generation request signal. The multiple CQI report values are values at multiple resource blocks allocated to the mobile station device. The mobile station device 10 indicates the CQI report values at the multiple resource blocks allocated thereto to the base station device.

The measurement processing unit 18 acquires information required for the measurement of the reception level of the common pilot channel, a CQI report value, and the like, from the signal processing unit 13, and outputs the reception level of the common pilot channel to the gap-necessity determining unit 19. Additionally, the measurement processing unit 18 outputs parameters required for the measurement control to the signal processing unit 13.

The gap-necessity determining unit 19 follows the instruction from the measurement processing unit 18 and determines gap necessity from the reception level of the common pilot channel. For example, an autonomous gap-generation control method is used as a gap-necessity determining method. If a gap is determined to be necessary, the gap-necessity determining unit 19 instructs the CQI generating unit 16 to generate RsvCQI.

The gap-length determining unit 20 determines the length of a gap to be generated by the gap generating unit 15 based on a table T1 explained hereinafter and stored in the storing unit 21. The storing unit 21 stores the table T1 for determining gap length (see FIG. 2 explained hereinafter) and a table T2 for defining RsvCQI (see FIG. 3 explained hereinafter).

FIG. 2 shows an example of the table T1 that is stored in the storing unit 21 of the mobile station device 10 and for determining gap length. The measurement type, the mobile station device class, and the required gap length are correlated and stored in the table T1. The measurement type indicates the kinds of monitoring a base station device to be executed by a mobile station device. The measurement type includes inter-frequency measurement for the inter-frequency handover, and lists of RATs (RAT#a and RAT#b) capable of the inter-RAT handover. RAT#a and RAT#b are, for example, UTRA (Universal Terrestrial Radio Access), GSM (Global System for Mobile Communications), or radio access technology other than those defined by 3GPP.

The mobile station device class indicates a performance indicator ordered according to measurement performance of each mobile station device. The required gap length indicates the minimum length required for measurement by TTI (Transmission Timing Interval).

FIG. 3 shows an example of the table T2 that is stored in the storing unit 21 (shown in FIG. 1) of the mobile station device 10 and for defining RsvCQI. A CQI report value, an encoding method, a modulation method, and the like are correlated and stored in the table T2. The encoding method includes Type 1 to Type 7. The modulation method includes Type a to Type c. The CQI report value is a value determined according to reception level of the common pilot channel. In the present embodiment, RsvCQI is defined not as a CQI report value that is not be actually measured, but a CQI report value that might be actually measured. As a result, all of the CQI report values might be reported as RsvCQIs even when a gap generation is not necessary. For this reason, a case where a CQI report value is zero, i.e., a value not to request packet scheduling by the base station device, is defined as RsvCQI.

By defining the RsvCQI as zero, wasteful radio resource consumption can be prevented even if every CQI report value of zero is transmitted when a gap is not necessary. A CQI report value that is other than zero may be defined as the RsvCQI.

Figure 4:
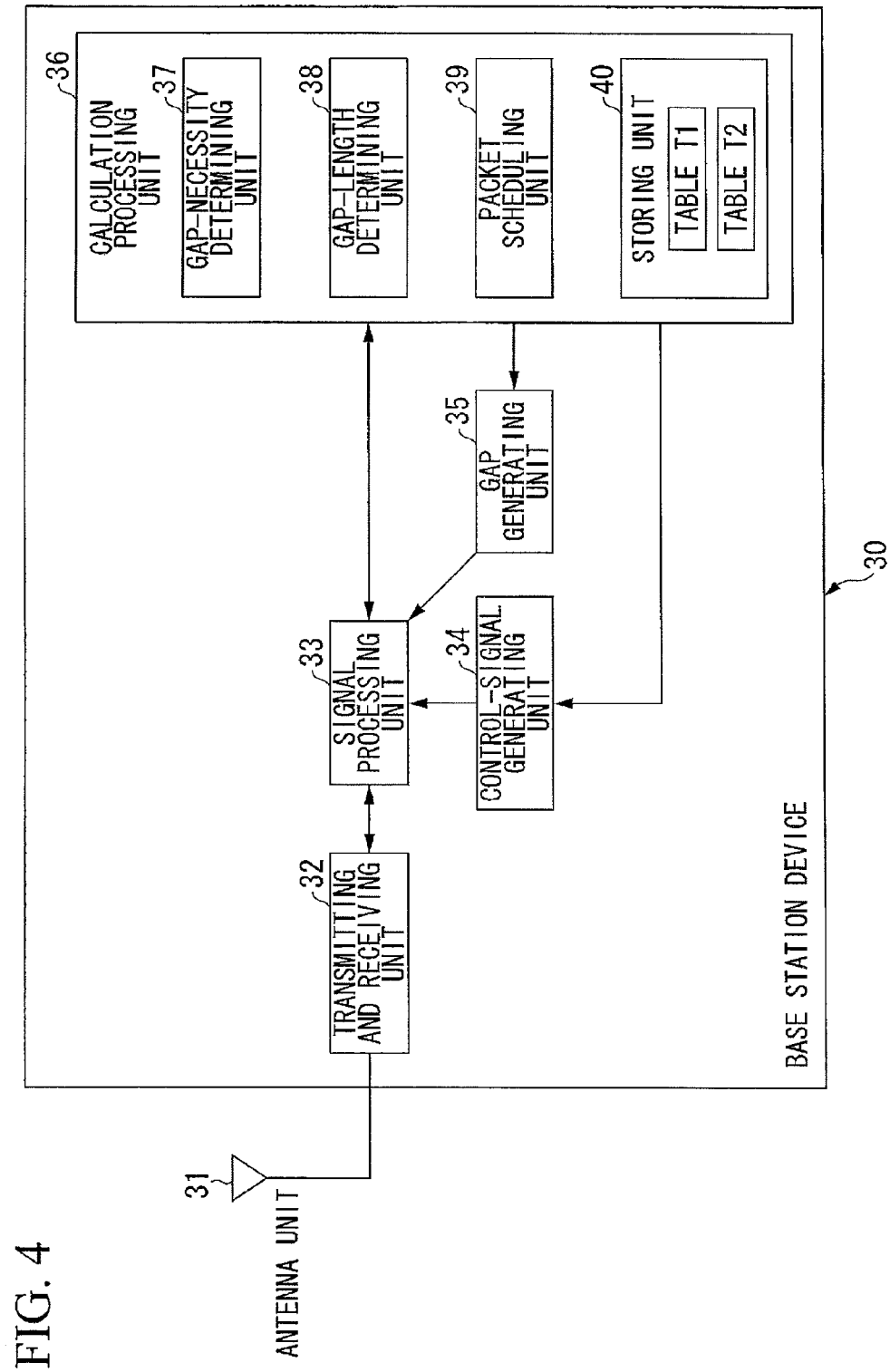
FIG. 4 is a block diagram showing the configuration of a base station device 30 according to the first embodiment of the present invention.

FIG. 4 is a schematic block diagram showing the configuration of a base station device 30 according to the first embodiment of the present invention. The base station device 30 includes an antenna 31, a transmitting and receiving unit 32 (control-signal transmitting unit), a signal processing unit 33, a control-signal generating unit (control-signal generating unit) 34, a gap generating unit 35, and a calculation processing unit 36.

The antenna unit 31 is used for transmitting and receiving a radio signal. The radio signal received by the antenna unit 31 is output to the transmitting and receiving unit 32.

The transmitting and receiving unit 32 demodulates and decodes the radio signal received through the antenna unit 31, and encodes and modulates transmission data. Additionally, the transmitting and receiving unit 32 receives multiple CQI report values from the mobile station device 10 through a physical channel. The physical channel is determined according to an encoding method or a modulation method, and includes a radio signal to be transmitted to a communication path for radio communication between the mobile station device and the base station device. Further, the transmitting and receiving unit 32 transmits a control signal generated by the control-signal generating unit 34 to the mobile station device 10 through the antenna 31.

The signal processing unit 33 analyzes the control signal transferred from the transmitting and receiving unit 32 as control data, and controls the transmitting and receiving unit 32 according to an input parameter.

Based on the determination result by the gap-necessity determining unit 37, the control-signal generating unit 34 generates a control signal for indicating whether or not to allow gap generation to the mobile station device 10. In other words, the control-signal generating unit 34 generates a control signal for controlling transmission suspension or resumption of a CQI report value indicated from the mobile station device 10 to the base station device 30 based on the determination result by the gap-necessity determining unit 37.

If a gap-necessity determining unit 37 determines to generate a gap, the gap generating unit 35 generates a gap whose length is determined by a gap-length determining unit 38 based on the table T1 (shown in FIG. 2) stored in a storing unit 40, or determines a period until the next CQI report period as the gap length. In other words, the gap generating unit 35 generates a gap based on the multiple CQI report values received by the transmitting and receiving unit 32.

The calculation processing unit 36 executes a series of control concerning radio control, and includes the gap-necessity determining unit (gap-generation determining unit) 37, the gap-length determining unit 38, a packet scheduling unit 39, and the storing unit 40.

The gap-necessity determining unit 37 determines whether or not gap generation is necessary based on the multiple CQI report values indicated by the mobile station device 10, for a signal transmitted from the base station device 30 to the mobile station device 10. The gap-necessity determining unit 37 determines that gap generation is requested from the mobile station device 10 when the RsvCQI (identical value) is set to all of the multiple CQI report values received by the transmitting and receiving unit 32. The gap-length determining unit 38 determines the length of a gap to be generated by the gap generating unit 35 based on the table T1 stored in the storing unit 40, or determines a period until the next CQI report period as the gap length.

The packet scheduling unit 39 controls which resource block on a two-dimensional plane defined by frequency and time (shown in FIG. 5) the signal to be transmitted from the base station device 30 to each mobile station device 10 is to be allocated to. Specifically, the packet scheduling unit 39 of the base station device 30 executes scheduling so as not to allocate a packet to a gap section generated based on the gap length determined by the gap-length determining unit 38.

Figure 5:
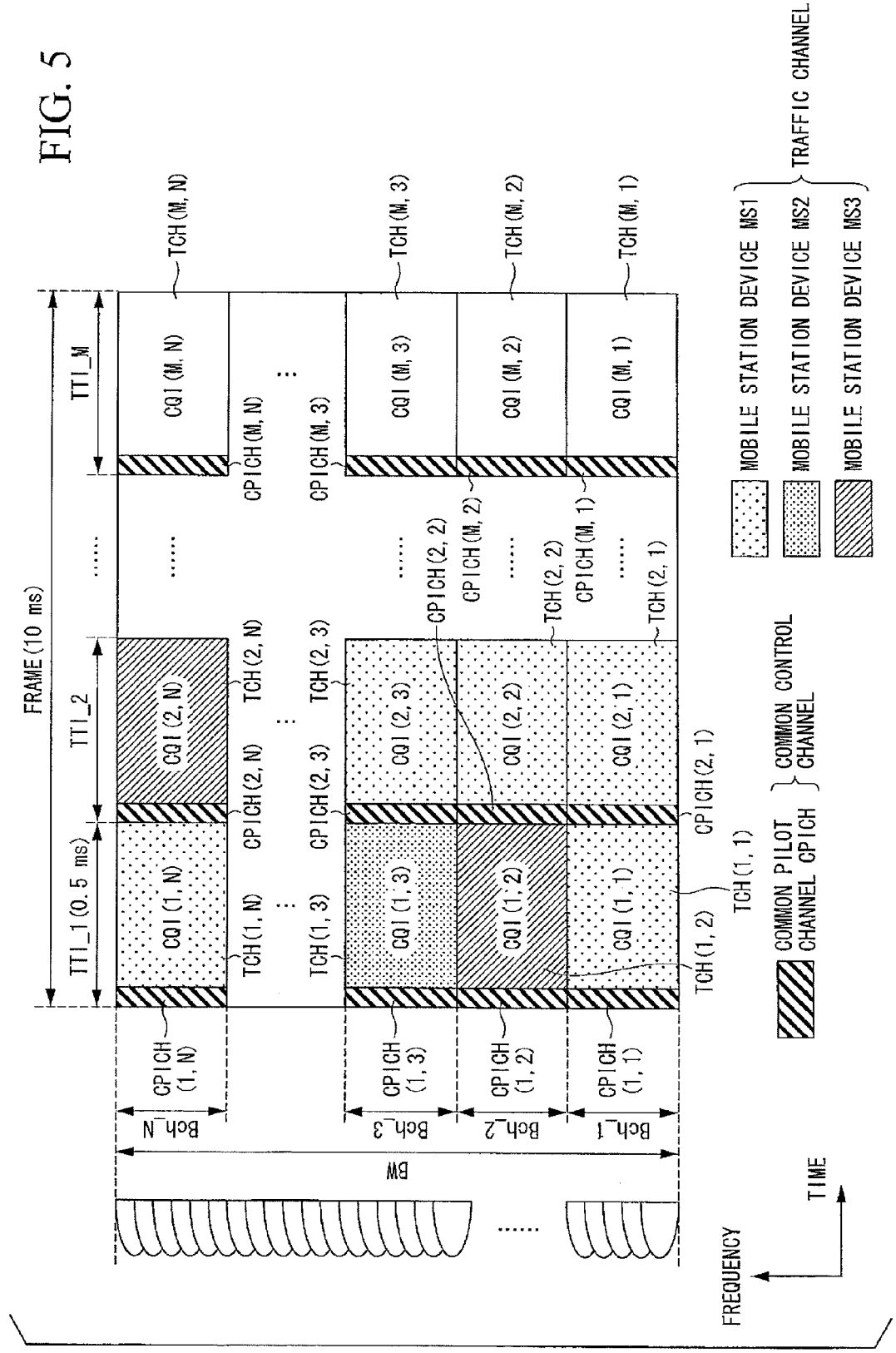
FIG. 5 is an explanatory view of resource blocks used in a first embodiment of the present invention.

FIG. 5 is an explanatory view of resource blocks used in the embodiments of the present invention. A case where a two-dimensional plane defined by a time axis and a frequency axis is divided into M pieces in the time-axis direction and N pieces in the frequency-axis direction, i.e., the total number of M×N resource blocks, is explained. A downlink radio frame is a bundle of multiple subcarriers on the frequency axis, and includes multiple two-dimensional radio resources blocks each defined by the frequency band width Bch on the frequency axis and the subframe interval TTI on the time axis.

BW and Bch shown in FIG. 5 denote the downlink frequency band width and the frequency band width of a resource block. A part of the resource blocks is used as traffic channels TCH (1, 1) to TCH (1, N), TCH (2, 1) to TCH (2, N), TCH (M, 1) to TCH (M, N), and mapped to each of the mobile station devices MS1 to MS3 using AMCS. Each of the three mobile station devices MS1 to MS3 calculates CQI report values of resource blocks mapped thereto from the reception levels of the common pilot channels, and reports the calculated CQI report values to the base station device.

As an example, traffic channels TCH (1, 1), TCH (1, N), TCH (2, 1) to TCH (2, 3) are allocated to the mobile station device M1. The mobile station device M1 calculates CQI (1, 1), CQI (1, N), CQI (2, 1) to CQI (2, 3) of the allocated resource blocks from reception levels of common pilot channels CPICH (1, 1), CPICH (1, N), CPICH (2, 1) to CPICH (2, 3).

A traffic channel TCH (1, 3) is allocated to the mobile station device MS2. The mobile station device MS2 calculates CQI (1, 3) of the allocated resource block from reception level of a pilot channel CPICH (1, 3).

Traffic channels TCH (1, 2) and TCH (2, N) are allocated to the mobile station device MS3. The mobile station device MS3 calculates CQI (1, 2) and CQI (2, N) of the allocated resource blocks from common pilot channels CPICH (1, 2) and CPICH (2, N).

Similar to HSDPA, a CQI report value is transmitted to the base station device by an L1 message. Additionally, control information concerning scheduling, etc., addressed to each mobile station device is allocated to each resource block and transmitted as an L1 message (not shown).

With reference to FIG. 4, the storing unit 40 stores the same tables T1 and T2 as the tables T1 (see FIG. 2) and T2 (see FIG. 3) stored by the storing unit 21 of the mobile station device 10.

Figure 6:
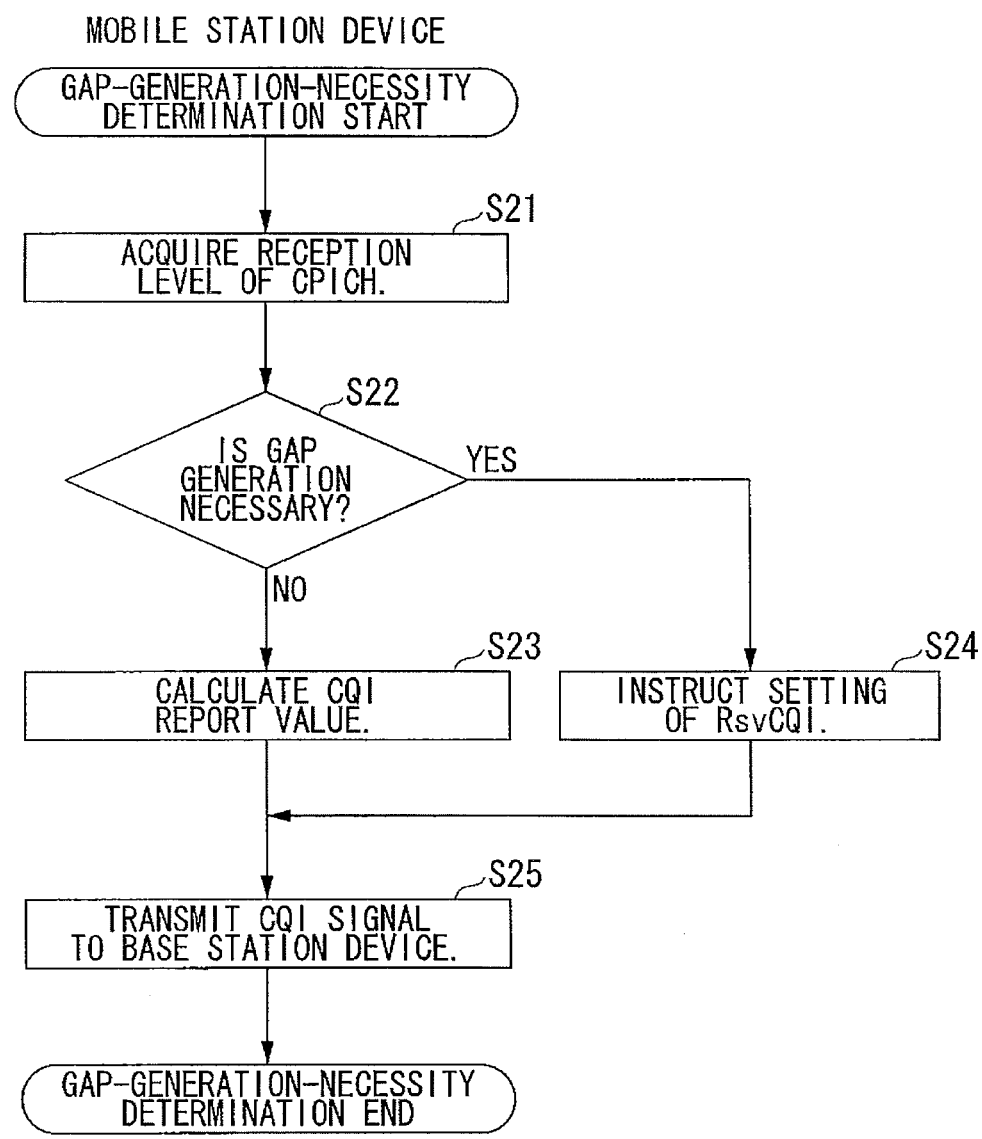
FIG. 6 is a flowchart showing processing of the mobile station device 10 according to the first embodiment of the present invention.

FIG. 6 is a flowchart showing processing of the mobile station device 10 according to the first embodiment of the present invention. This flowchart shows processing for the mobile station device to determine gap generation necessity.

Firstly, the transmitting and receiving unit 12 receives, through antenna unit 11, a control signal transmitted over the common pilot channel from the base station device 30. The signal processing unit 13 measures the reception level of the common pilot channel received by the transmitting and receiving unit 12, and outputs the reception level to the gap-necessity determining unit 19. Thus, the gap-necessity determining unit 19 acquires the reception level of the common pilot channel (step S21).

The gap-necessity determining unit 19 determines whether or not gap generation is necessary based on the reception level of the common pilot channel (step S22). At this time, an autonomous gap generation method, etc., can be used as the determination condition of the gap-necessity determining unit 19. Additionally, the measured reception level of the common pilot channel is compared with a given threshold. When the reception level of the common pilot channel is below the given threshold, it can be determined that gap generation is necessary. Before radio communication between the mobile station device 10 and the base station device 30 is commenced, i.e., the processing of the flowchart shown in FIG. 6 is commenced, the given threshold is preliminarily indicated from the base station device 30 to the mobile station device 10 using broadcast information or an L3 message, defined as a particular value in the mobile communication system, or defined as a system parameter by the mobile station device, and stored in the storing unit 21.

If gap generation is determined to be necessary at step S22, the gap-necessity determining unit 19 outputs, to the CQI generating unit 16, an instruction to set the RsvCQI stored in the table T2 of the storing unit 21 (zero in this case) to all of multiple CQI report values to be indicated from the mobile station device 10 to the base station device 30 (step S24). Receiving the RsvCQI generation instruction from the gap-necessity determining unit 19, the CQI generating unit 16 generates a CQI signal by setting the RsvCQI to all of the multiple CQIs to be indicated to the base station device 30, and transmits the CQI signal to the base station device (step S25).

On the other hand, if the gap-necessity determining unit 19 determines at step S22 that gap generation is not necessary, the CQI determining unit 14 calculates a CQI report value (step S23), and the CQI generating unit 16 generates a CQI signal based on the CQI report value and transmits the CQI signal to the base station device (step S25). The CQI signal generated by the CQI generating unit 16 is transmitted to the base station device as an L1 message (using a physical channel) from the antenna unit 11 through the signal processing unit 13 and the transmitting and receiving unit 12.

Figure 7:
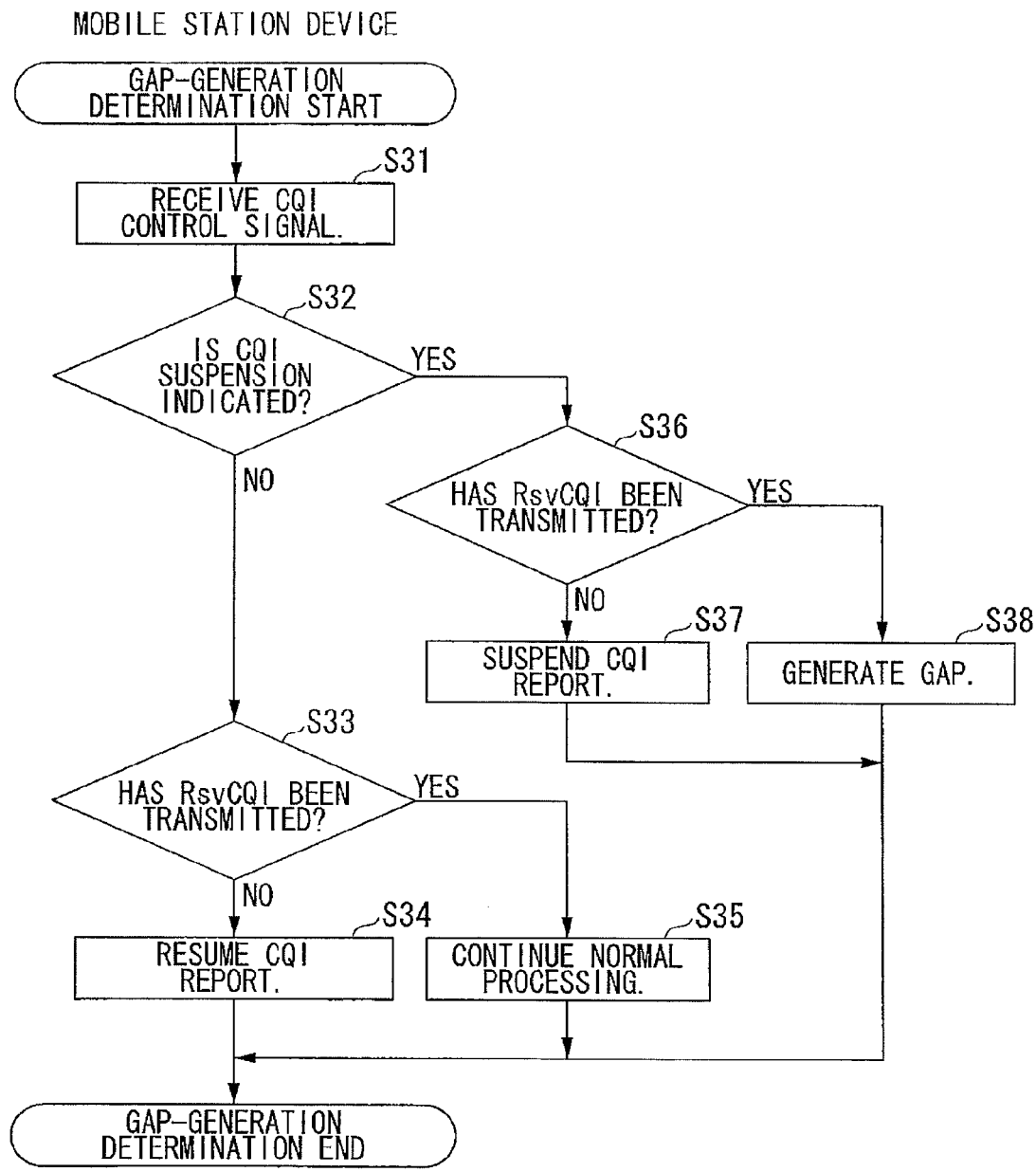
FIG. 7 is a flowchart showing processing of the mobile station device 10 according to the first embodiment of the present invention.

FIG. 7 is a flowchart showing processing of the mobile station device 10 (shown in FIG. 1) according to the first embodiment of the present invention. This flowchart shows processing when the mobile station device 10 receives a control signal for instructing CQI report suspension or resumption from the base station device 30.

Firstly, the transmitting and receiving unit 12 receives, through the antenna unit 11 (shown in FIG. 1), a CQI control signal (control signal) transmitted as an L1 message from the base station device 30 (step S31). The signal processing unit 13 determines whether or not CQI suspension (CQI off) is indicated by the CQI control signal received by the transmitting and receiving unit 12 (step S32).

If it is determined at step S32 that CQI suspension is indicated, whether or not the RsvCQI has been transmitted to the base station device 30 before the mobile station device 10 receives the CQI control signal is determined (step S36). If it is determined at step S36 that the RsvCQI has been transmitted to the base station device 30, the gap generating unit 15 determines that a gap generation request is allowed, and generates a gap (step S38). On the other hand, if it is determined at step S36 that the RsvCQI has not been transmitted to the base station device 30, the CQI report from the mobile station device 10 to the base station device 30 is suspended (step S37).

On the other hand, if CQI suspension is not indicated at step S32, i.e., CQI restart is indicated from the base station device 30 to the mobile station device 10, whether or not the RsvCQI has been transmitted from the mobile station device 10 to the base station device 30 is determined (step S33). This determination processing is executed by the measurement processing unit 18 based on the control data analyzed by the signal processing unit 13.

If it is determined at step S33 that the RsvCQI has been transmitted from the mobile station device 10 to the base station device 30, it is determined that the gap generation request from the mobile station device 10 to the base station device 30 has been rejected, and the normal processing continues (step S35). On the other hand, if it is determined at step S33 that the RsvCQI has not been transmitted from the mobile station device 10 to the base station device 30, the CQI report from the mobile station device 10 to the base station device 30 that has been suspended is resumed (step S34).

Figure 8:
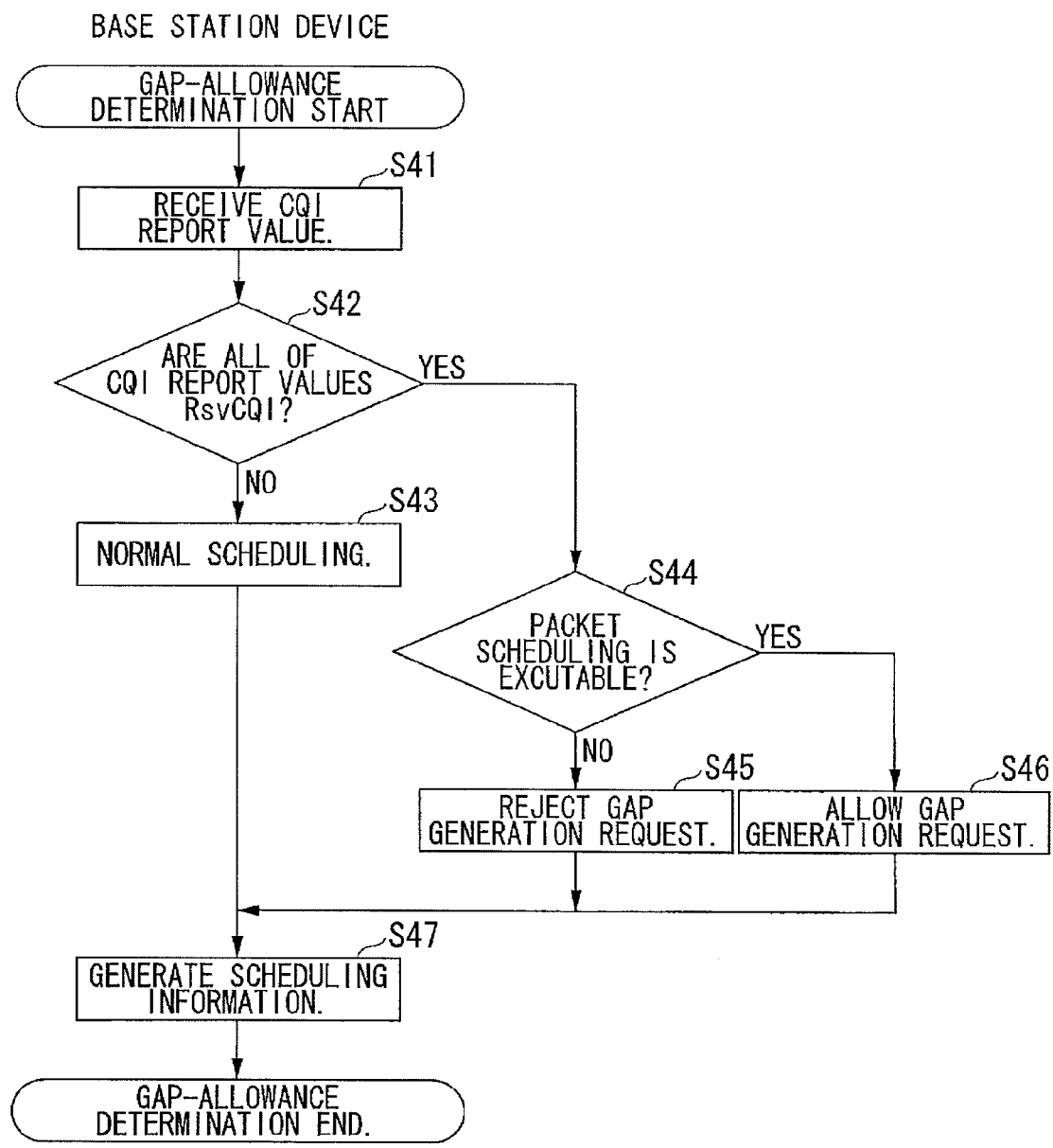
FIG. 8 is a flowchart showing processing of the base station device 30 according to the first embodiment of the present invention.

FIG. 8 is a flowchart showing processing of the base station device 30 (shown in FIG. 4) according to the first embodiment of the present invention.

Firstly, the transmitting and receiving unit 32 of the base station device 30 receives a CQI report value reported as an L1 message from each mobile station device (step S41). Referring to the RsvCQI stored in the table T2 of the storing unit 40, the gap-necessity determining unit 37 determines whether or not all of the multiple CQI report values received for the CQI report period are the RsvCQI (step S42). If all of the received CQI report values are the RsvCQI, the gap-necessity determining unit 37 determines that the mobile station device 10 has requested a gap generation. The packet scheduling unit 39 determines whether or not gap generation is executable by packet scheduling for the mobile station device 10 that has requested the gap generation (step S44).

The determination whether or not the packet scheduling for gap generation is executable is executed using a known technique.

If it is determined at step S44 that the packet scheduling for the gap generation is executable, i.e., the gap request from the mobile station device 10 is allowed (step S46), the packet scheduling unit 39 sets a value indicative of CQI report suspension to an L1 message to the mobile station device 10, generates scheduling information (step S47), and transmits the scheduling information to the mobile station device 10. On the other hand, if it is determined at step S44 that the packet scheduling for the gap generation is not executable, i.e., the gap request from the mobile station device 10 is rejected (step S45), the packet scheduling unit 39 sets a value indicative of CQI report resumption to an L1 message to the mobile station device 10, generates scheduling information (step S47), and transmits the scheduling information to the mobile station device 10.

At this time, the value indicative of the CQI report suspension or resumption may be reversed. In other words, it is explained in FIG. 9 that a control signal indicative of CQI report suspension is transmitted from the base station device to the mobile station device if a determination result transmitted from the base station device is the gap allowance at step S54. However, a control signal indicative of CQI report resumption may be transmitted from the base station device to the mobile station device at step S54. In this case, the CQI report is suspended if a gap generation is rejected. In this case, whether or not CQI report resumption is indicated is determined at step S32, shown in FIG. 7.

On the other hand, it is determined at step S42 that at least one of the received CQI report values is different from the RsvCQI, the normal packet scheduling is executed (step S43).

Figure 9:
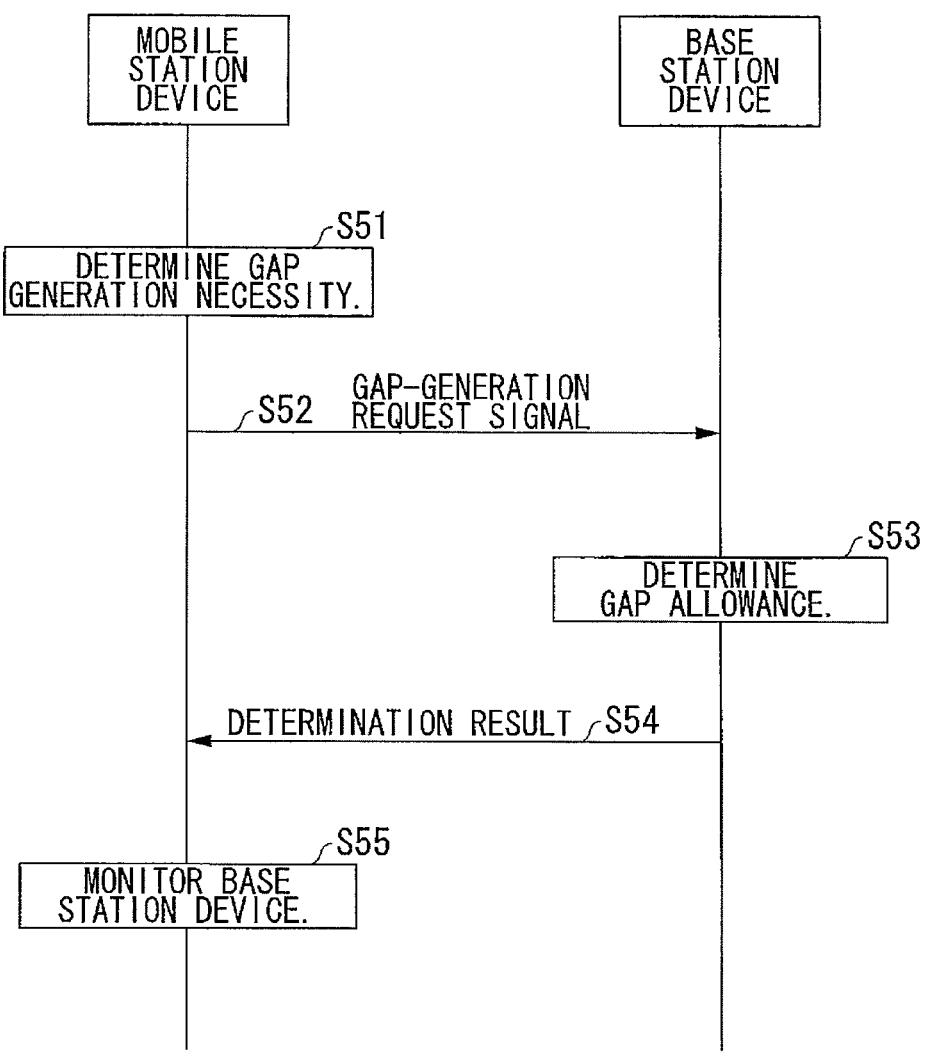
FIG. 9 is a sequence chart showing processing of a mobile communication system according to the first embodiment of the present invention.

FIG. 9 is a sequence chart showing processing of the mobile communication system according to the first embodiment of the present invention. The mobile station device 10 determines whether or not gap generation for a neighboring cell measurement is necessary based on the reception level of the common pilot channel (step S51). The processing at step S51 corresponds to the processing of the flowchart explained in FIG. 6.

If it is determined at step S51 that a gap generation is necessary, the mobile station device 10 transmits a gap-generation request signal to the base station device 30 using an L1 message in which a particular CQI report value in lieu of a normal CQI report value is set to all of the CQI report values of the resource blocks to be reported without newly generating a control signal as a gap generation request (step S52).

The RsvCQI is defined not as a specific CQI value indicative of gap generation request, but as a normal CQI value (see FIG. 3). If all of the multiple received CQI report values are the RsvCQI, the base station device 30 determines that the mobile station device 10 has requested gap generation and determines whether or not to allow the gap generation (step S53). The processing at step S53 corresponds to the processing of the flowchart explained in FIG. 8.

The base station device 30 uses not a new control signal for allowance or rejection of the gap-generation request, but a conventional L1 message indicative of CQI report suspension or resumption, and thereby transmits a determination result to the mobile station device 10 (step S54). If the gap generation request is allowed by the determination result, the mobile station device 10 monitors a base station device using a gap (step S55).

The amount of the communication between the mobile station device 10 and the base station device 30 can be reduced by using any one of the following methods (1) to (5) as a method of transmitting a CQI report value from the mobile station device 10 to the base station device 30.

(1) Only the top M CQI report values among the CQI report values measured by the mobile station device 10 are reported (M is a natural number). If five resource blocks are allocated to the mobile station device 10, CQI report values of 0, 1, 2, 3, and 4 are measured at these resource blocks, for example, the mobile station device 10 transmits 2, 3, and 4 to the base station device 30 as the top three CQI report values (M=3).

(2) A difference from a CQI report value of an adjacent resource block in the frequency axis direction or the time axis direction is calculated, and only the difference is transmitted from the mobile station device 10 to the base station device 30. For example, the difference between a CQI report value of a resource block (for example, 0) and a CQI report value of an adjacent resource block in the frequency axis direction or the time axis direction (for example, 1) is calculated, and the difference (for example, +1) is transmitted from the mobile station device 10 to the base station device 30.

(3) Resource blocks corresponding to CQI report values are expressed as a bit map and the bit map is transmitted from the mobile station device 10 to the base station device 30.

(4) The resource blocks are expressed as a hierarchical structure, and CQI report values are transmitted from the mobile station device 10 to the base station device 30.

(5) The amount of CQI information is compressed using the discrete cosine transform and transmitted from the mobile station device 10 to the base station device 30.

Figure 10A:
FIG. 10A is an explanatory view of a method of reducing the amount of communication between the mobile station device and the base station device.

The (3) and (4) methods are explained specifically. As shown in FIG. 10A, a case where 8 resource blocks X1 to X8 are allocated to the mobile station device is explained. The horizontal axis shown in FIG. 10A represents the frequency. 3 bits are required for identifying resource blocks X1 to X8, 5 bits are required for expressing a CQI report value, and therefore $(3+5) \times n$ bits are required in the case of n reception resource blocks. An average value of entire reception resource blocks or a value of an individual resource block may be used as a CQI report value.

In the (3) method, 1 resource block is expressed by 1 bit, and the resource blocks of X1 to X8 shown in FIG. 10A are expressed by 8 bits. If the resource blocks X1, X3, and X4 are received by the mobile station device and the average CQI thereof is 5, for example, which can be expressed as [1, 0, 1, 1, 0, 0, 0, 0][05], 8+5=13 bits are required. In this case, the average of the entire reception resource blocks X1 to X8 is used as a CQI report value.

Figure 10B:
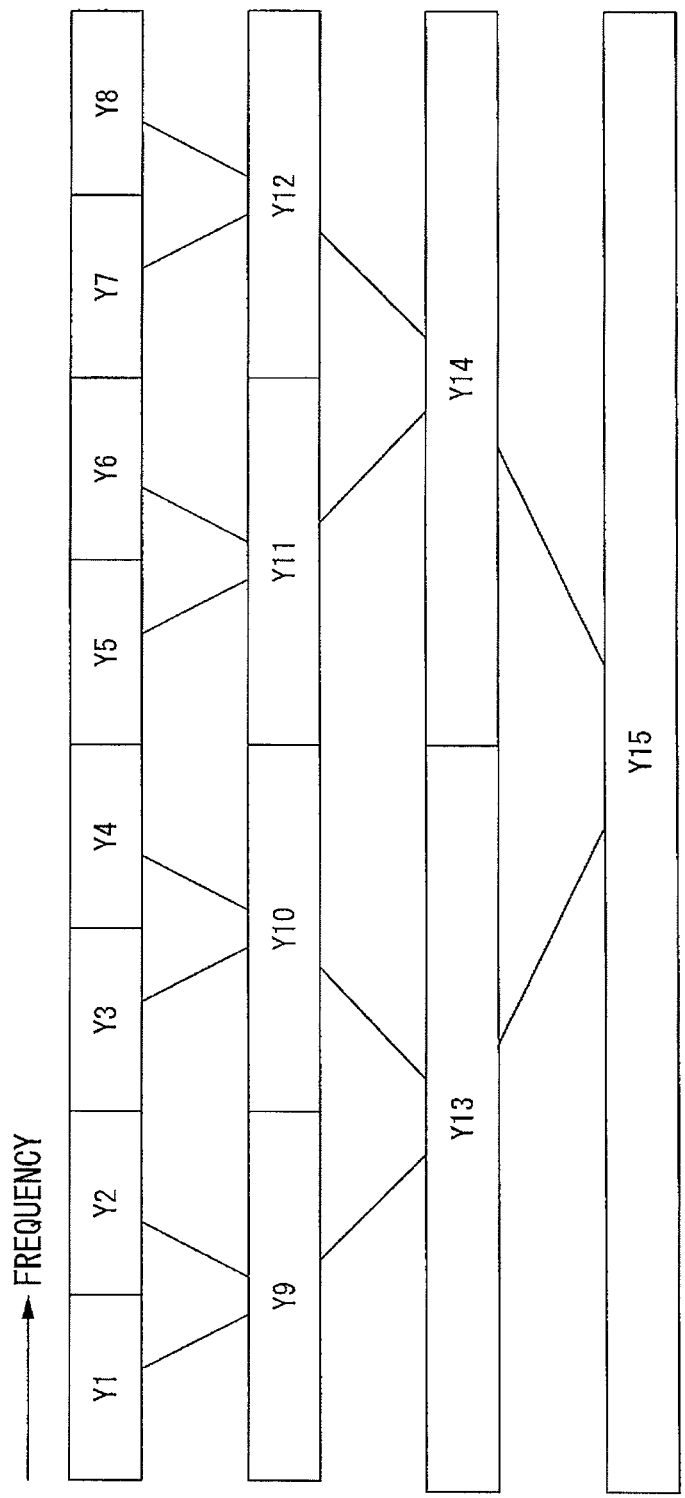
FIG. 10B is an explanatory view of a method of reducing the amount of communication amount between the mobile station device and the base station device.

In the (4) method, resource blocks Y1 to Y15 are expressed by a hierarchical structure as shown in FIG. 10B. The horizontal axis shown in FIG. 10B represents the frequency. The resource block Y9 is a combination of the resource blocks Y1 and Y2. The resource block Y13 is a combination of the resource blocks Y1 to Y4. 4 bits are required for identifying each resource block, 5 bits are required for expressing a CQI report value, and therefore 4+5=9 bits are required. In this case, the average value of the entire reception resource blocks is used as a CQI report value.

When the mobile communication method according to the present embodiment is used, the (1) to (5) methods can be combined and applied. In the (1) method, the top M CQI report values may be set as the RsvCQI. In the (2) method, a difference to be the RsvCQI may be defined, and all of the differences may be set as the RsvCQI. In the (3) method, RsvCQI and the bitmap may be reported at the same time. In the (4) method, the CQI report value designated by the hierarchical structure may be set as the RsvCQI. In the (5) method, the CQI information is compressed after the RsvCQI is set, and the original RsvCQI may be received after uncompression. Therefore, all of the CQI report values may be set as the RsvCQI.

If a gap length is set equal to the CQI report period, an excessive gap length is allocated to the mobile station device 10 which has high measurement performance, for example. Hereinafter, an adequate gap length is allocated using the table T1 (see FIG. 2) according to the measurement performance of the mobile station device 10 and the kind of the measurement. Specifically, the gap-length determining unit 20 of the mobile station device 10 determines required gap lengths differently depending on the mobile station device class (measurement performance) and the measurement type (neighboring cell information) of the mobile station device 10. Similarly, the gap-length determining unit 38 of the base station device 30 determines gap lengths differently depending on the mobile station device class and the measurement type of the mobile station device 10.

The information concerning the mobile station device class in the table T1 shown in FIG. 2 is indicated from the mobile station device 10 to the base station device 30 before the start of communication with a serving cell. As the measurement type, information concerning neighboring cells around the serving cell such as an inter-frequency handover available area, an inter-RAT handover available area, and priorities thereof is acquired from broadcast information. Therefore, the mobile station device 10 and the base station device 30 can generate the table T2 shown in FIG. 2 at the start of the communication. The mobile station device 10 that determines that gap generation is necessary and transmits RsvCQI to the base station device 30, and the base station device 30 that receives the RsvCQI from the mobile station device 10 refer to the table to retrieve the required gap length based on the measurement type and the mobile station device class to calculate the location of the gap section. The measurement is performed based on the measurement type in the priority order. If a measurement result is not fulfilled in a handover condition even after the measurements are repeated a given number of times, the measurement is performed based on the measurement type with the next highest priority.

As explained above, according to the first embodiment of the present invention, a gap generation request and a response thereto can be executed using an L1 message with respect to gap generation in EUTRA/EUTRAN. Therefore, there is no need of separately transmitting a control signal for the gap generation, thereby preventing radio resource waste.

Additionally, a new parameter and a new control signal are unnecessary. Therefore, simpler and faster processing concerning gap generation of the mobile station device 10 and the base station device 30 is enabled, thereby reducing power consumption.

Furthermore, mutual confirmation concerning gap generation is enabled between the mobile station device 10 and the base station device 30 with the use of an L1 message even when an information amount of CQI report values is reduced, and a gap start timing or a gap end timing can be matched.

Moreover, an overhead due to communication at a higher layer can be prevented in the present embodiment where gap generation is requested from L1 of the mobile station device to L1 of the base station device. Therefore, a gap can be generated faster in the present embodiment than in the case where gap generation is requested from a higher layer of the mobile station device to a higher layer of the base station device.

Second Embodiment

Hereinafter, a second embodiment of the present invention is explained. The case where the CQI report value is transmitted from the mobile station device 10 to the base station device 30 only one time is explained in the first embodiment. However, the case where the CQI report values are transmitted from the mobile station device 10 to the base station device 30 multiple times is explained in the second embodiment.

Figure 11:
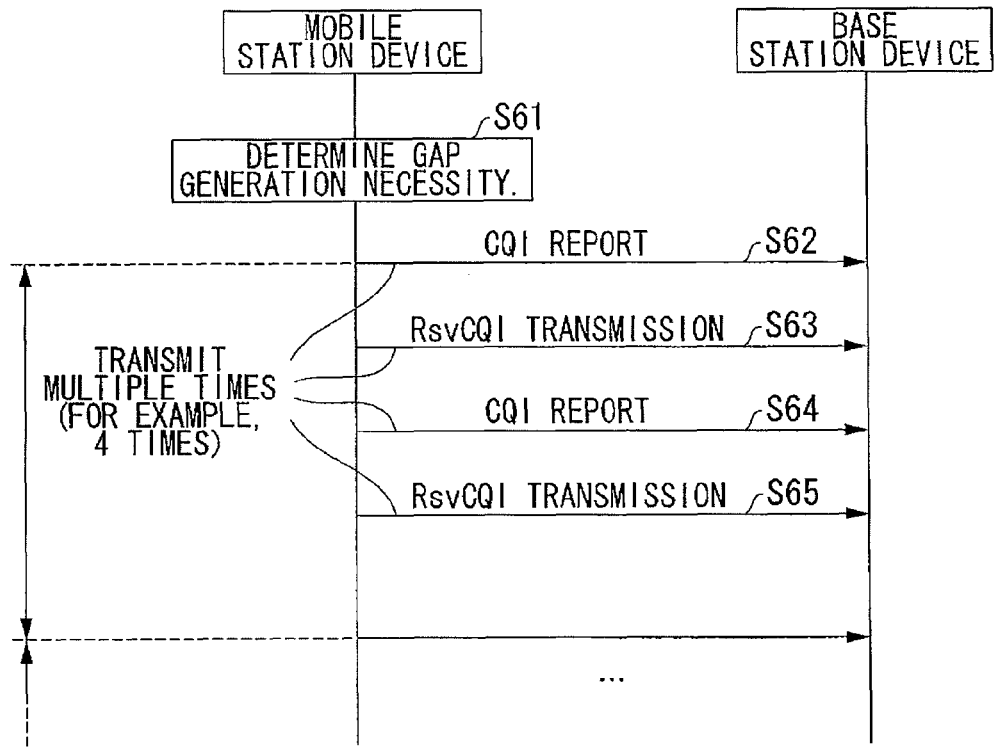
FIG. 11 is a sequence chart showing processing of a mobile communication system according to a second embodiment of the present invention.

FIG. 11 is a sequence chart showing processing of a mobile communication system according to a second embodiment of the present invention. Firstly, the mobile station device 10 (shown in FIG. 1) determines whether or not gap generation for measuring neighboring cells corresponding to base station devices on a different frequency is necessary based on the reception level of the pilot signal of the common pilot channel (step S61). If it is determined at step S61 that gap generation is necessary, the mobile station device 10 transmits, as a gap generation request, an L1 message in which the RsvCQI in lieu of a normal CQI report value is set to all of the CQI report values of resource blocks to be reported to the base station device 30 multiple times without using a new control signal. Specifically, the CQI generating unit 16 generates the RsvCQI multiple times, and the transmitting and receiving unit 12 transmits the RsvCQIs generated multiple times by the CQI generating unit 16 to the base station device 30 through a physical channel multiple times.

FIG. 11 shows a case where the CQI report and the RsvCQI transmission from the mobile station device 10 to the base station device 30 are executed four times in total (steps S62 to S65). The number of times for the CQI report and the RsvCQI transmission is preliminarily indicated from the base station device 30 to the mobile station device 10 through broadcast information or the control signal in the serving cell. Upon transmission an even number of times (steps S63 and S65), the mobile station device 10 transmits the RsvCQI in lieu of the CQI report. Upon transmission an odd number of times (steps S62 and S64), the mobile station device 10 may transmit the RsvCQI in lieu of the CQI report.

The transmission number of times may be divided into a first half (steps S62 and S63) and a second half (steps S64 and 65), the CQI report may be executed at one half, and the RsvCQI transmission may be executed at the other half. What number of times RsvCQI is to be transmitted at during the CQI report may be fixed, indicated by broadcast information from the base station device 30 to the mobile station device 10, or preliminarily indicated from the base station device 30 to the mobile station device 10.

As explained above according to the second embodiment, the RsvCQI is transmitted from the mobile station device to the base station device through a physical channel multiple times. Therefore, the RsvCQI reception error rate of the base station device 30 can be reduced compared with the case where the RsvCQI is transmitted from the mobile station device to the base station device through a physical channel multiple times. Additionally, the normal CQI report is executed when the RsvCQI is not transmitted. Therefore, lack of information due to the RsvCQI transmission can be prevented.

Further, an overhead due to communication at a higher layer can be prevented in the present embodiment where gap generation is requested multiple times from L1 of the mobile station device to L1 of the base station device. Therefore, the base station device 30 can generate a gap faster in the present embodiment than in the case where gap generation is requested multiple times from the upper layer of the mobile station device to the upper layer of the base station device.

Third Embodiment

Hereinafter, a third embodiment of the present invention is explained. The case where the mobile station device 10 transmits the RsvCQI to the base station device 30, and then the base station device 30 responds to the mobile station device 10 has been explained in the first embodiment. A case where the base station device 30 does not respond to the mobile station device 10 is explained in the present embodiment.

Figure 12:
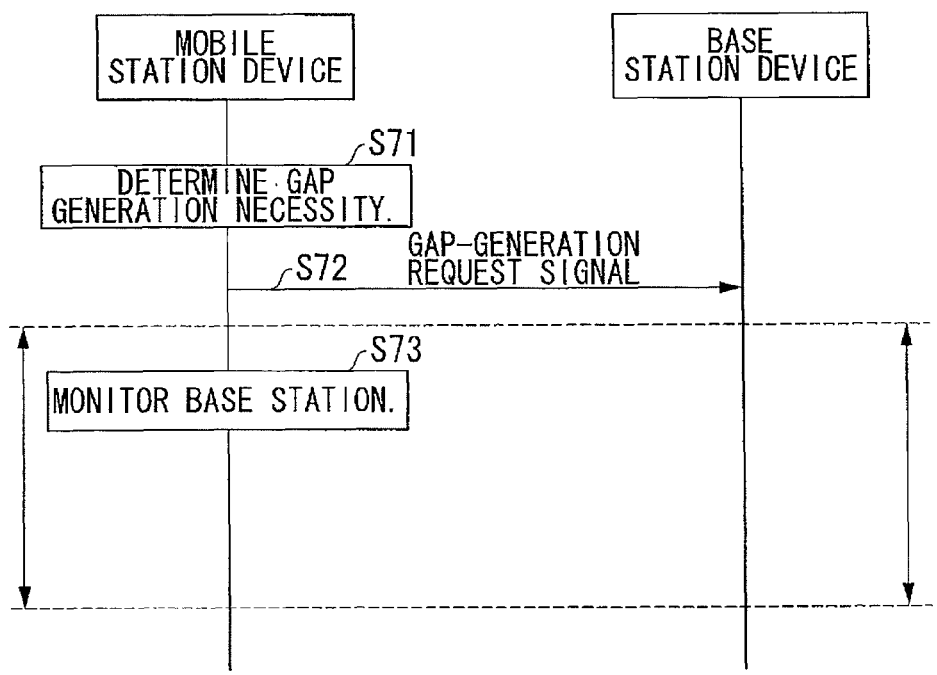
FIG. 12 is a sequence chart showing processing of a mobile communication system according to a third embodiment of the present invention.
Figure 13:
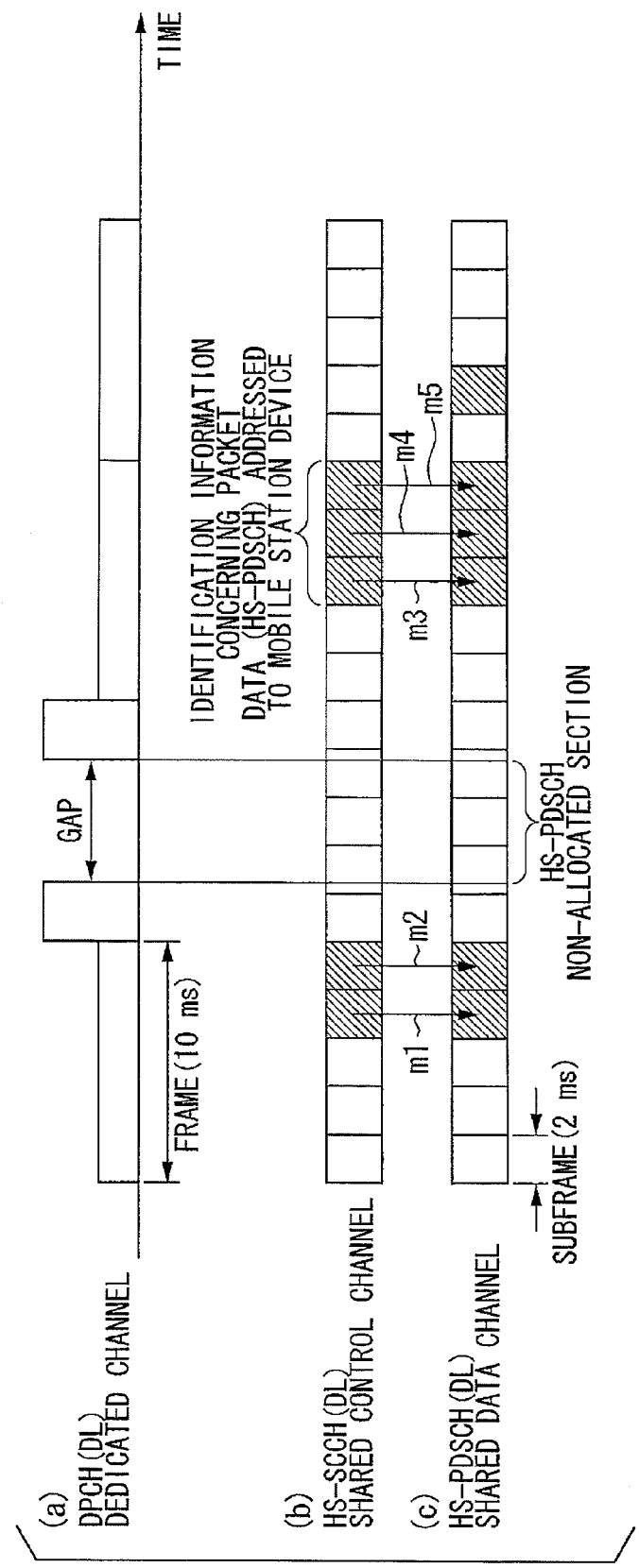
FIG. 13 is an explanatory view of a case where a compressed mode is applied to a dedicated channel of W-CDMA and where monitoring of a base station device on a different frequency is being executed.
Figure 14:
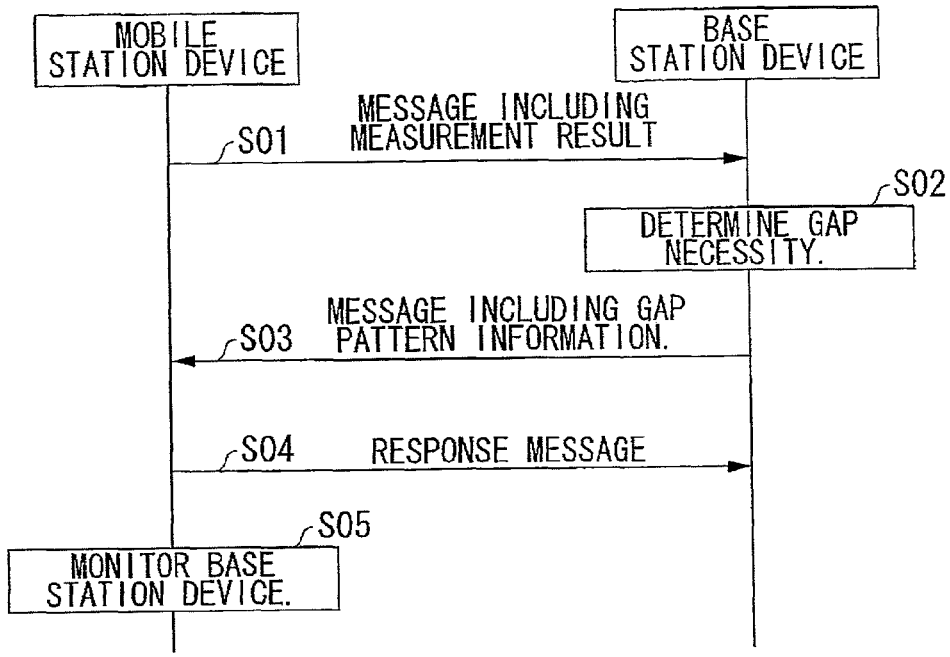
FIG. 14 is a sequence chart showing processing of the mobile communication system in execution of the compressed mode.
Figure 15:
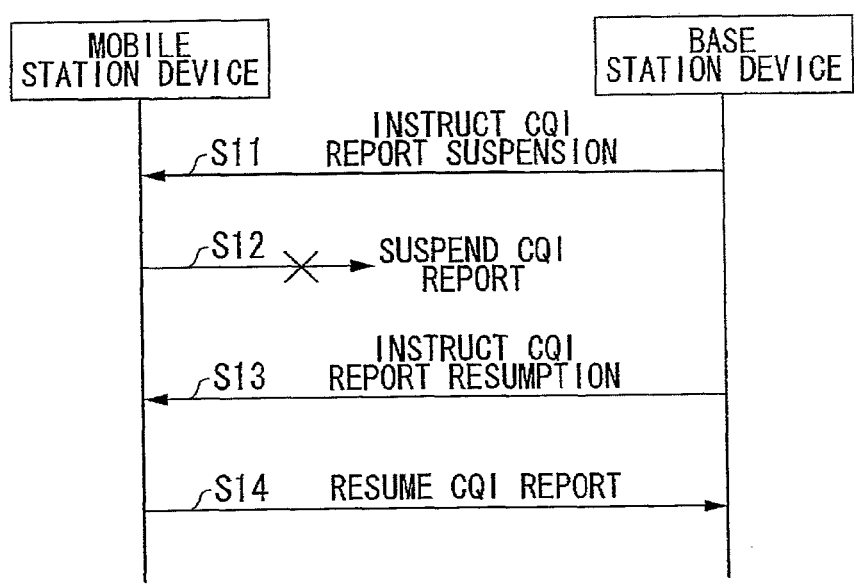
FIG. 15 is a sequence chart showing processing of the mobile communication system related to a CQI-report suspension and resumption.
Figure 16:
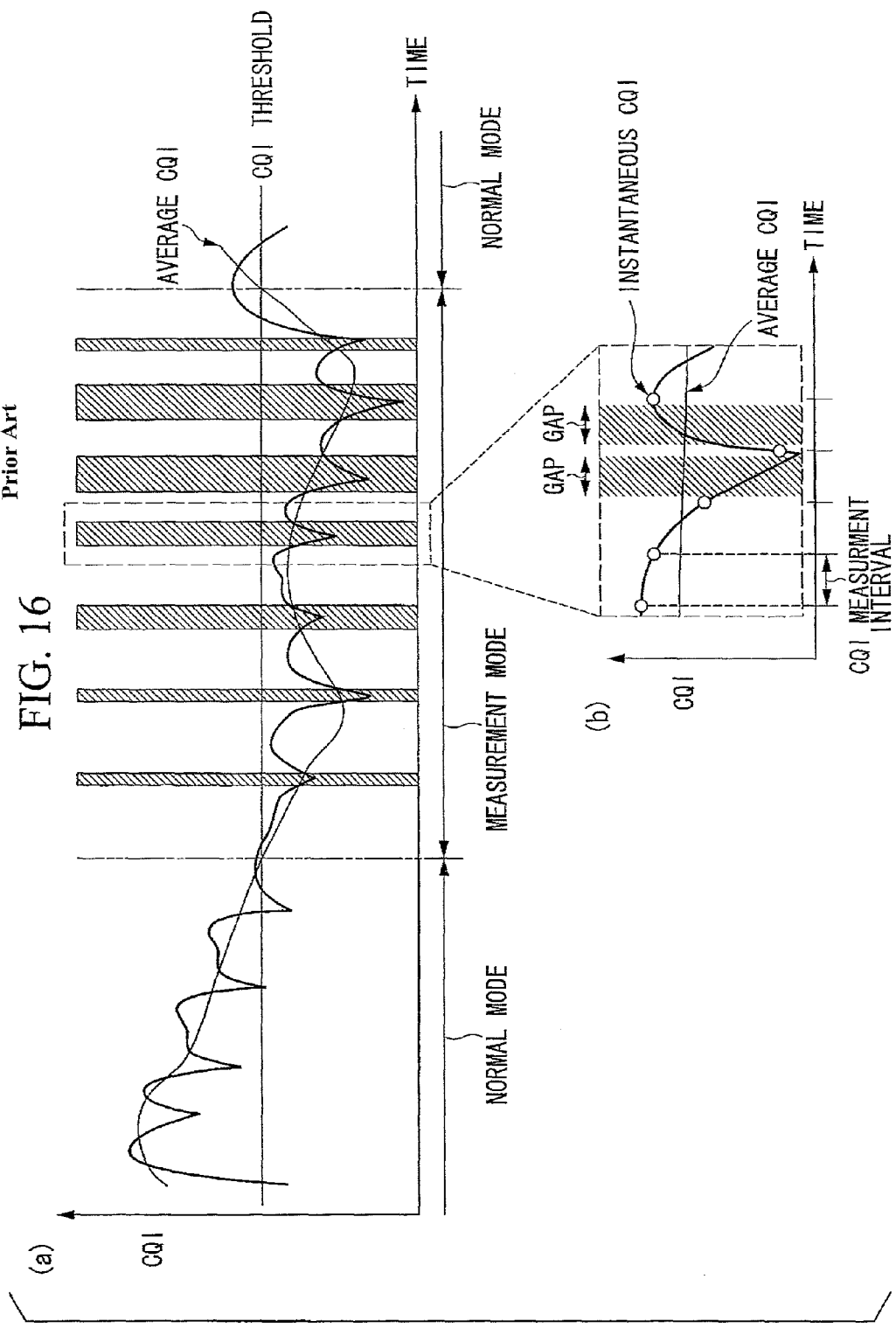
FIG. 16 is an explanatory view of an autonomous gap-generation method of the mobile station device.

FIG. 12 is a sequence chart showing processing of a mobile communication system according to the third embodiment of the present invention. Firstly, the mobile station device 10 determines whether or not gap generation for measuring neighboring cells corresponding to base station devices on a different frequency is necessary based on the reception level of the pilot signal of the common pilot channel (step S71).

If it is determined at step S71 that gap generation is necessary, the mobile station device 10 transmits, as a gap generation request, an L1 message in which the RsvCQI in lieu of a normal CQI report value is set to all of the CQI report values of resource blocks to be reported to the base station device 30 without using a new control signal (step S72).

The mobile station device 10 that has transmitted the RsvCQI and received all of the preliminarily-scheduled resource blocks addressed thereto determines that a gap starts from the next TTI without waiting for a response from the base station device 30, and commences monitoring of a base station device using the gap (step S73). In other words, it is determined in the present embodiment that a gap generation request is always allowed. At this time, the base station device 30 preferentially executes packet scheduling for the mobile station device 10 that has transmitted the RsvCQI, and certainly generates a gap. The gap length may be fixed or determined using the table T2 shown in FIG. 2 as explained in the first embodiment.

According to the third embodiment, the base station device 30 has no need of responding to the mobile station device 10. Therefore, further reduction in radio resources is enabled compared with the first embodiment.

According to the first to the third embodiments explained above, a known L1 message is used and transmitted as a control signal for gap generation. Therefore, the waste of radio resources can be kept to the minimum. Further, a new parameter and a new control signal is unnecessary, thereby making the processing of the base station device 30 and the mobile station device 10 faster and reducing power consumption.

In the embodiments explained above, a program for implementing the functions or a part thereof of the transmitting and receiving unit 12, the signal processing unit 13, the CQI determining unit 14, the gap generating unit 15, the CQI generating unit 16, the calculation processing unit 17, the measurement processing unit 18, the gap-necessity determining unit 19, and the gap-length determining unit 20 that are shown in FIG. 1, and the transmitting and receiving unit 32, the signal processing unit 33, the control-signal generating unit 34, the gap generating unit 35, the calculation processing unit 36, the gap-necessity determining unit 37, the gap-length determining unit 38 and the packet scheduling unit 39 that are shown in FIG. 4 may be stored in a computer-readable recording medium so that a computer system reads and executes the program stored in the recording medium, and thereby the control of the mobile station device 10 or the base station device 30 may be executed. The "computer system" includes an OS and hardware such as a peripheral device.

The "computer-readable recording medium" includes a portable medium such as a flexible disk, an optical disc, a ROM, a CD-ROM, and the like, and a storage device such as a hard disk installed in a computer system. The "computer-readable recording medium" includes a medium dynamically storing a program for a short period such as a communication line in a case where a program is transmitted through a network such as the Internet or a communication line such as a telephone line, and a medium storing a program for a given period such as volatile memory in a computer system of a server or a client in the above case. The program may be for implementing a part of the aforementioned functions or for implementing the aforementioned functions using a combination of the program and another program stored in the computer system.

Although the embodiments of the present invention were explained in detail with reference to the accompanying drawings, the detailed configuration is not limited to these embodiments, and various modifications can be made without departing from the scope of the present invention.

The invention claimed is:

1. A mobile communication method for a mobile station device that communicates with a base station device, the mobile communication method comprising:
   receiving, from the base station device, a control signal not including one length for permitting the mobile station device to perform monitoring of a neighboring cell, wherein the control signal is transmitted in a case where a gap is required to measure a neighboring cell;
   generating the gap based on the one length of plural lengths,
   the gap being used in the monitoring,
      each of the plural lengths corresponding to one of measurement types according to a predetermined rule,
      the one length being autonomously determined based on the control signal not including the one length,
      the one length depending on a measurement type of the neighboring cell,
      the plural lengths being common with the base station device,
      the predetermined rule being common with the base station device, and
      the measurement type comprising a radio access technology (RAT), and being reported to the base station device as a measurement capability of the mobile station device.

2. A mobile station device that communicates with a base station device, the mobile station device comprising:
   a receiving circuit configured to and/or programmed to receive, from the base station device, a control signal not including one length for permitting the mobile station device to perform monitoring of a neighboring cell, wherein the control signal is transmitted in a case where a gap is required to measure a neighboring cell;
   a generation circuit configured to and/or programmed to generate the gap based on the one length of plural lengths,
   the gap being used in the monitoring,
      each of the plural lengths corresponding to one of measurement types according to a predetermined rule,
      the one length being autonomously determined based on the control signal not including the one length,
      the one length depending on a measurement type of the neighboring cell,
      the plural lengths being common with the base station device,
      the predetermined rule being common with the base station device, and
      the measurement type comprising a radio access technology (RAT), and being reported to the base station device as a measurement capability of the mobile station device.

* * * * *